(12) United States Patent
Beckington (10) Patent No.: US 7,134,812 B2
(45) Date of Patent: Nov. 14, 2006

(54) TOOL COOLANT APPLICATION AND DIRECTION ASSEMBLY

(76) Inventor: Kevin Beckington, 10246 Pleasant Lake Rd., Ann Arbor, MI (US) 48103

( * ) Notice: Subject to any disclaimer, the term of this patent is extended or adjusted under 35 U.S.C. 154(b) by 454 days.

(21) Appl. No.: 10/197,390

(22) Filed: Jul. 17, 2002

(65) Prior Publication Data

US 2004/0013480 A1    Jan. 22, 2004

(51) Int. Cl.
  *B23Q 11/00*    (2006.01)
(52) U.S. Cl. .............. 408/56; 408/61; 279/20; 409/136
(58) Field of Classification Search .......... 408/56, 408/57, 60, 61; 409/135, 136; 279/20; 407/11
See application file for complete search history.

(56) References Cited

U.S. PATENT DOCUMENTS

| | | | |
|---|---|---|---|
| 1,617,554 A | | 2/1927 | Swartz |
| 2,343,632 A | * | 3/1944 | Bakewell .............. 408/222 |
| 2,491,635 A | | 12/1949 | Allen |
| 2,669,889 A | | 2/1954 | Holler |
| 2,690,149 A | * | 9/1954 | Adams ................ 112/281 |
| 2,692,996 A | | 11/1954 | Wallace |
| 2,916,749 A | | 12/1959 | Ingwer et al. |
| 2,996,061 A | * | 8/1961 | Miller ................ 408/59 |
| 3,176,330 A | | 4/1965 | Jennings |
| 3,461,750 A | | 8/1969 | Achelis et al. |
| 3,583,383 A | * | 6/1971 | Ovshinsky .............. 125/20 |
| 3,868,195 A | * | 2/1975 | Anderson et al. ......... 408/61 |
| 3,874,808 A | | 4/1975 | Zaccardelli et al. |
| 3,908,510 A | | 9/1975 | Koskolos et al. |
| 4,213,354 A | * | 7/1980 | Dahinden ............. 408/61 |
| 4,570,952 A | | 2/1986 | Heimbigner et al. |
| 4,669,933 A | * | 6/1987 | Dye ................. 409/136 |
| 4,770,570 A | * | 9/1988 | Tsui et al. ............ 408/61 |
| 4,795,292 A | * | 1/1989 | Dye ................. 409/136 |
| 4,911,253 A | * | 3/1990 | Cliche ............... 175/213 |
| 4,949,813 A | | 8/1990 | Kidder et al. |
| 5,163,790 A | | 11/1992 | Vig |
| 5,190,421 A | | 3/1993 | Wen et al. |
| 5,275,516 A | * | 1/1994 | Liaw ................ 409/136 |
| 5,358,360 A | * | 10/1994 | Mai ................. 409/136 |
| 5,402,696 A | * | 4/1995 | Hecht et al. ........... 82/158 |
| 5,660,510 A | | 8/1997 | Taniguchi et al. |
| 5,993,121 A | | 11/1999 | Fiesta |
| 6,059,702 A | | 5/2000 | Winkler et al. |

* cited by examiner

*Primary Examiner*—Monica Carter
*Assistant Examiner*—Sara Addisu
(74) *Attorney, Agent, or Firm*—Carlson, Gaskey & Olds (57) ABSTRACT

A coolant assembly for supplying coolant fluid to a tool includes an outer ring defining an inlet and an insert pressed within the outer ring including an annular channel. The annular channel is in communication with the inlet defined by the outer ring and includes a plurality of passages disposed to direct fluid along an axis of a tool. At least two of the passages are disposed at different angles relative to the axis of the tool to direct coolant along the entire length of the tool in order to provide a uniform and consistent stream of coolant and uniform and consistent temperature of the tool.

12 Claims, 5 Drawing Sheets

TOOL COOLANT APPLICATION AND DIRECTION ASSEMBLY

BACKGROUND OF THE INVENTION

This invention relates to an assembly for directing coolant flow onto a machine tool, and specifically to an assembly for directing coolant flow onto a tool at different locations along the rotational axis.

Typically, in a conventional machining process a stream of coolant is directed onto the cutting tool to maintain a constant temperature. Without coolant flow, friction from the tool and the workpiece generate heat of a degree sufficient to damage the tool. Further, not only would the tool be damaged, but also the quality of the machines surface of the work piece are degraded. For these reasons it is desirable direct a stream of coolant onto a tool during machining operations. Machining produces metal chips that are preferably evacuated from the machining area in order to prevent damage to the tool and work piece. The stream of coolant aids evacuation of metal chips from the work piece during machining.

Typical arrangements for directing coolant onto a tool include the use of a plurality of hoses arranged to direct fluid onto the tool. These hoses are typically of a semi-rigid design extending around a tool and manually positioned to direct coolant onto a tool. Often during the machining, the work piece or chips bump and contact the coolant lines changing the position of the hose such that the coolant is no longer directed as originally positioned onto the tool. In addition, hoses are often not positionable for providing coolant as desired when machining of relatively deep openings or holes. Further, in some part configurations an adjustable coolant hose is simply not feasible and does not supply and direct coolant flow adequately to the tool.

It is known in the art to provide a system for directing fluid between the machine and spindle to direct flow. Such systems require expensive and complicated fluid routing mechanisms in order to route coolant fluid substantially near the axis of rotation of the tool. Further, such systems are not easily adaptable to tool changes.

Accordingly, it is desirable to provide a low cost, easily changeable and configurable coolant directing assembly that directs coolant along the tool without obstructing machining operations.

SUMMARY OF THE INVENTION

An embodiment of this invention is a coolant collar placed over a tool and including a plurality of passages having differing angles to direct coolant flow at different locations along the axis of rotation of the tool.

In one embodiment of this invention, an outer ring includes an inlet for coolant and an insert pressed within the outer ring including an annular channel in fluid communication with the inlet. A plurality of passages in fluid communication with the annular channel includes openings disposed annularly about an axis of rotation. Each passage is disposed at an angle relative to the axis of rotation of the tool and at least two of the passages are at differing angles relative to each other to direct the coolant flow at different points along the axis of rotation of the tool.

The insert also includes at least one coolant hole communicating coolant fluid to an interface between the rotating tool and an inner diameter of the insert. The coolant hole creates a fluid bearing between the tool and the inner diameter of the insert that retards frictional build-up of heat. The inner diameter of the insert slides over the rotating tool and is held in place on the tool by a semi-flexible coolant line. The collar simply slides over the rotating tool providing for quick tooling changeovers.

In another embodiment of this invention, a tool holder includes an insert having an annular channel in fluid communication with an inlet defined by an outer ring pressed onto the outer diameter of the insert. The insert includes a body portion for rigidly mounting the tool to the machine and includes at least one setscrew securing the tool within the tool holder. In this embodiment, the tool is held stationary as the workpiece is rotated about an axis of rotation. Coolant flow through the inlet and annular channel exits the insert through passages directing coolant fluid along the axis of the tool. The passages are annularly disposed about a face of the insert and includes at least two passages of differing angles for directing coolant fluid at different points along the tool.

In yet another embodiment of this invention, a tool holder includes an insert having an annular channel, and coolant channels communicating coolant from an inlet within the insert to coolant passages. An outer sleeve completes a portion of the coolant channels to provide continuous fluid communication from the inset to the coolant passages. The tool holder of this embodiment secures the tool within an inner diameter and rotates with the spindle of the machine. Coolant is communicated through the tool holder from a coolant source within the machine that provide coolant to the inlet in the tool holder.

Accordingly, embodiments of this invention provide easy mounting to existing tooling and machinery while directs coolant along the entire length of a tool without complex piping and valving and does not interfere with the work piece tool interface during machining.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figures 1, 2, 3:
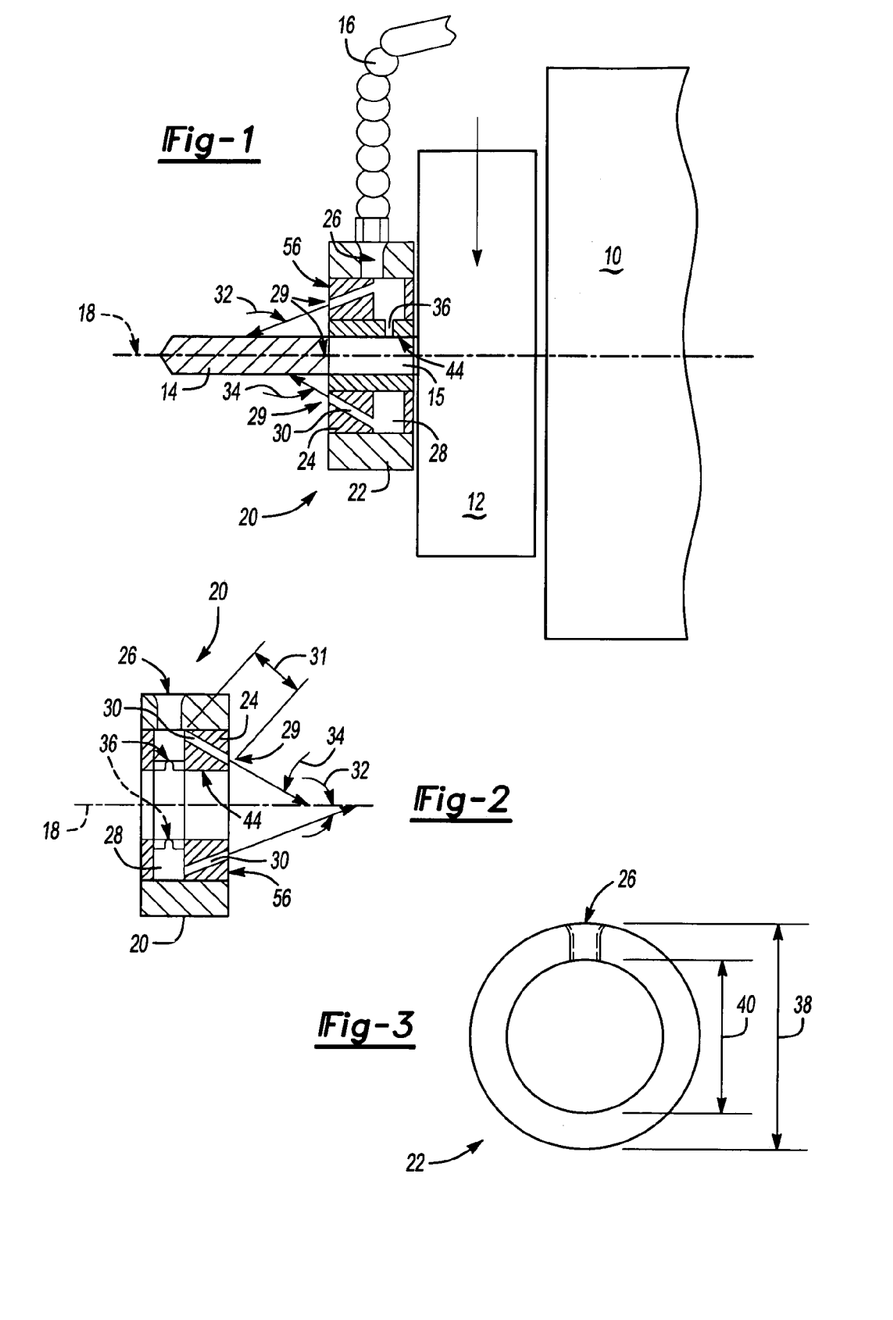
FIG. 1 is a schematic view of an embodiment of this invention.
FIG. 2 is a cross-sectional view of the embodiment of this invention shown in FIG. 1.
FIG. 3 is plan view of an outer ring.

Referring to the FIG. 1, a machine 10 rotates a spindle 12 and tool 14 about an axis 18. The tool 14 is of any kind known to a worker skilled in the art. Disposed about the tool 14 is a coolant collar assembly 20. The coolant collar 20 is held in place by semi-rigid coolant line 16. The coolant line 16 is a hose or pipe capable of maintaining a desired position as understood by a worker skilled in the art. The collar 20 slides over the tool 14 and abuts the spindle 12. The coolant collar 20 includes an outer ring 22 having a coolant inlet 26. Within the outer ring 22 is insert 24. The insert 24 includes an annular channel 28 in fluid communication with the inlet 26 of the outer ring 22 to provide fluid to coolant passages 30. The coolant passages 30 are disposed at an angle relative to the axis of rotation 18 to direct coolant flow along the tool 14.

Each of the passages 30 terminates at an opening 29 on the face 56 of the insert. No portion of the passage 30 extends past the face 56 of the insert. The passages 30 are disposed at an angle relative to the axis of rotation 18 such that coolant is directed at different locations along the axis 18. Directing coolant along the tool 14 provides consistent and uniform cooling of the tool 14. As appreciated, non-uniform and non-consistent cooling can increase wear on the tool 14 decreasing tool life. At least two of the passages 30 are at differing angles. The differing angles provide for the application of coolant at differing locations and points along the tool 14.

In one embodiment of this invention, one of the coolant passages 30 includes an angle 34 and another of the coolant passages 30 includes an angle 32. Angles 32 and 34 are different from each other. Preferably, one of the angles 32, 34 is at 15° relative to the axis of rotation and another of the angles 32,34 is at 8° relative to the axis of rotation. In another embodiment, one angle is 20° and the other is 5°. It should be understood that it is within the contemplation of this invention that other angles may be used within this invention such that coolant is directed at several points along the tool 14.

The insert 24 includes at least one coolant hole 36. The inner diameter 44 is sized such that the coolant collar 20 simply slides over the tool 14. The interface between the tool 14 and inner diameter 44 is a bearing surface. Preferably, the insert is constructed from bronze to provide desirable wear properties, however, it is within the contemplation of this invention to use other materials as are known to a worker skilled in the art.

The coolant hole 36 provides coolant at the interface between the tool 14 and the inner diameter of insert 24. Coolant between the tool 14 and insert 24 creates a fluid bearing that prevents heat buildup between a shank 15 of the tool 14 and the coolant collar 20.

The inner diameter 44 of the insert 24 is sized to cooperate with the outer diameter of the tool 14. The specific inner diameter of the insert 24 may be of any size desired to accommodate the tool 14. The inner diameter 44 is preferably sized to provide a slip fit while maintaining desired position of the coolant collar 20 relative to the tool 14.

An advantage of this invention is the ease in changeovers of coolant collars 20 corresponding with different sizes and types of tools. The tool 14 and insert 24 are changed to provide for differing tool sizes by disconnecting the coolant hose 16 from the collar 20, changing the tool 14 and then sliding a correspondingly sized coolant collar 20 onto the new tool.

Referring to FIG. 2, the coolant collar 20 is shown in cross-section and includes the outer ring 22 surrounding the insert 24. The insert 24 includes the annular channel 28. The annular channel 28 cooperates and corresponds to the inlet 26 to provide a flow passage for coolant. The passages 30 are disposed at an angle relative to the axis of rotation 18. The insert 24 also includes the coolant holes 36. Although, two coolant holes are show, it is within the contemplation of this invention to provide any number of coolant holes to provide coolant between the inner diameter 44 and the tool 14.

The passages 30 terminate at the opening 29 on the face 56 of the insert 24. No portion of any passage 30 extends beyond the face 56. An angle 32,34 of the passages 30 are the only means of directing coolant flow onto a tool rotating along the axis of rotation 18. There are no external features to the coolant collar 20 to interfere with machining of a workpiece. Further, there are no external features that can interfere between the interface of the tool 14 and workpiece.

Figures 4, 5, 6, 7:
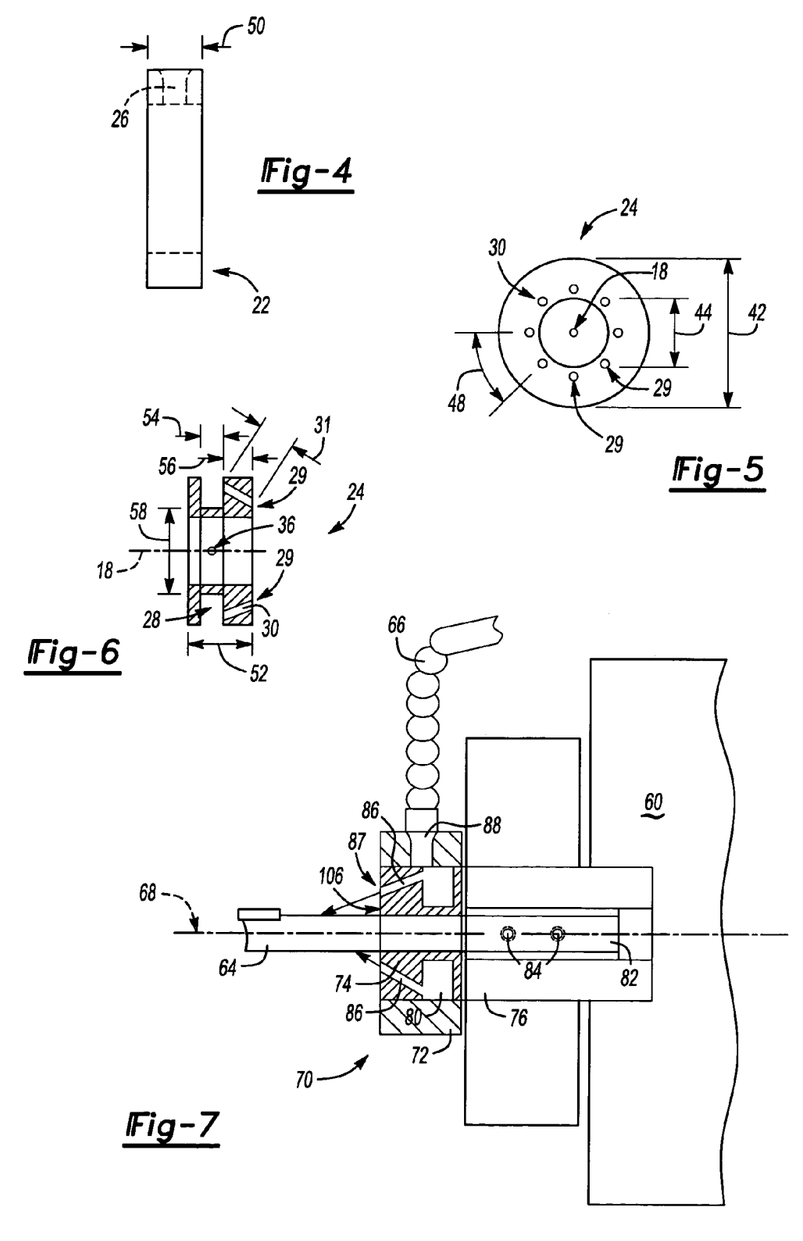
FIG. 4 is a side view of the outer ring.
FIG. 5 is a plan view of the insert.
FIG. 6 is a side cross-sectional view of the insert.
FIG. 7 is a schematic view of another embodiment of this invention.
Figure 8:
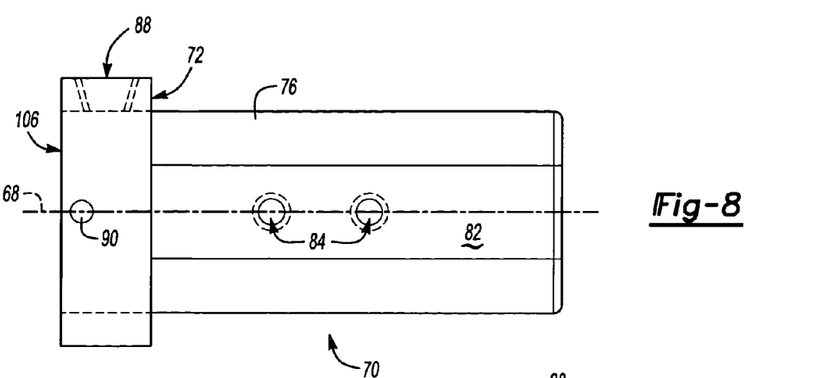
FIG. 8 is a plan view of the embodiment of this invention shown in FIG. 7.
Figure 9:
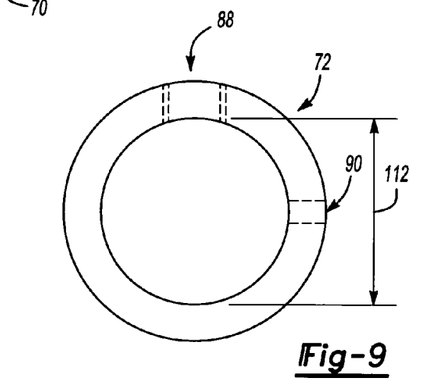
FIG. 9 is a plan view of the outer ring.
Figure 10:
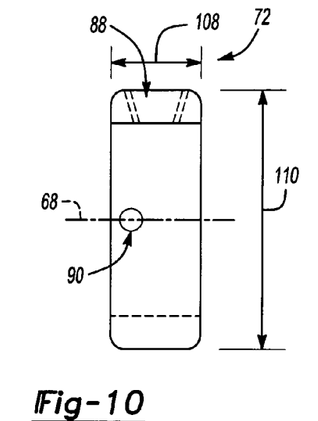
FIG. 10 is a side view of the outer ring.
Figure 11:
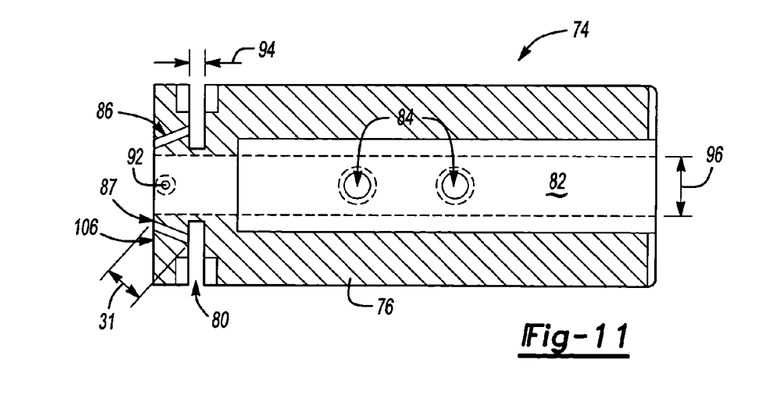
FIG. 11 is a side partial cross-sectional view of the insert.
Figure 12:
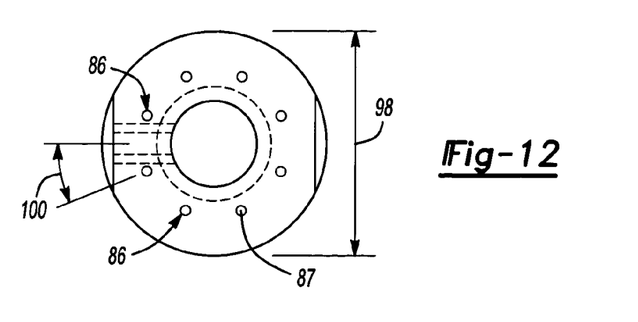
FIG. 12 is a plan view of the insert.

Referring to FIGS. 3 and 4, the insert 24 is shown disassembled from the outer ring 22. The outer ring 22 includes a width 50 common with the width 52 of the insert 24 (FIG. 6). The outer ring 22 includes outer diameter 38 and inner diameter 40. The inner diameter 40 preferably provides a fluid tight press fit with the outer diameter 42 of the insert 24 (FIG. 6). The press fit between the outer ring 20 and insert 24 is as is known in the art to provide a fluid seal in order to prevent large quantities of coolant from escaping through the interface between the insert 24 and outer ring 22. As appreciated, a certain amount of fluid flow through the interface of the insert 24 and outer ring 22 is allowable and does not degrade the performance of the coolant collar 20.

Referring to FIGS. 5 and 6, passages 30 terminate at the face 56 and are disposed annular about the axis 18. Preferably, each of the passages 30 are annularly spaced at consecutive angles indicated at 48. Preferably, the angle between each passage is 45°, however, as appreciated, other annular distances and spacing are within the contemplation of this invention as required by application specific requirements.

The insert 24 includes thickness 56. The thickness 56 ensures that the passages 30 have sufficient length 31 to direct and form a coolant stream. The thickness 56 must be of sufficient width to form a stream of coolant. The thickness 56 must be such that a stream is created. A simple opening in the insert would create a spray of coolant that would not sufficiently and uniformly cool the tool. For this reason, the thickness 56 is of such a thickness to provide passages 30 sufficient length 31 such that a steam of coolant is formed and directed at the tool.

The insert 24 includes the annular channel 28. The annular channel 28 has an inner diameter 58. The inner diameter 58 cooperates with the overall outer diameter 42 of the insert 24 to form the channel and provide sufficient coolant supply to the passages 30. Further, the diameter 58 of the annular channel 28 provides communication of coolant between the inlet 26 the passages 30. Along with the diameter 58 is a width 54 of the annular channel 28. The width 54 of the annular channel 28 also provides for the sufficient supply of coolant through the passages 30. The insert 24 also includes an overall thickness 52. As appreciated the overall thickness 52, 50 of the coolant collar 20 is application specific and other thicknesses are within the contemplation of this invention.

Referring to FIG. 7, another embodiment of this invention is a tool holder indicated at 70 mounted within a machine 60 for holding a non-rotating tool 64. The non-rotating tool 64 is disposed along an axis 68. The tool holder 70 of this embodiment includes an outer ring 72 having a coolant inlet 88. The coolant inlet 88 is in communication with coolant line 66. The outer ring 72 is pressed onto insert 74. The insert 74 includes an annular channel 80 in fluid communication with the inlet 88 and passages 86.

The insert 74 includes a body portion 76 that is mounted within the machine 60 and includes setscrews 84 securing the tool 64 within the tool holder 70. The body 76 is generally a cylindrical having a flat surface 82 for aligning the tool holder 70 within the machine 60. The insert 74 includes passages 86 disposed at an angle relative to the axis 68. The angle of passages 86 relative to the axis 68 directs coolant along the tool 64.

In this embodiment, the tool 64 does not rotate about the axis 68. The tool 64 in this embodiment does not rotate relative to rotation of the work piece and may be of any type known to a worker skilled in the art. Preferably, the tool 64 is a boring bar used for machining surfaces within a work piece. Such surfaces require coolant discharge within an opening of the workpiece. The passages 86 terminates at face 106 of the insert 74 and do not extend beyond that face 106. In this way, coolant is discharged onto the tool 64 does not hindered machining of the work piece. The specific angle of the passages 86 are such that coolant is directed along the axis 68 to provide uniform cooling of the tool 64. Further, the direction of coolant along the tool 64 provides for the evacuation of chips created during the machining process. The tool holder 70 of this invention includes a substantially flat face 106 with an opening 87 at which passages 86 terminated and are angled relative to the axis 68 directing flow along the tool 64. This allows the tool 64 to extend within the work piece without substantial interference.

Referring to FIGS. 8 through 12, the tool holder 70 is shown disassembled from the machine 60. The outer ring 72 includes a clearance hole 90 corresponding to a set screw 92 for securing the tool 64 within the insert 74.

The outer ring 72 includes an inner diameter 112 that cooperates with an outer diameter 98 of the insert 74. The outer ring 72 includes the inlet 88. The inlet 88 may be threaded as is known by a worker skilled in the art for a corresponding fitting of the coolant line 66. The outer ring 72 includes a width 108 corresponding with the insert 74 and annular groove 80.

The insert 74 includes an annular groove 80 that has a width 94. The width 94 cooperates with the width 108 of the outer ring 72 to form a fluid channel to provide coolant from the inlet 88 through the passages 86. The insert 74 also includes an inner diameter 96 that is sized to correspond with the outer diameter of the tool 64. The inner diameter 96 may be of any size or shape as is known to a worker skilled in the art to correspond with the mounting of a tool 64. The insert 74 includes the flat surface portion 82 corresponding with the machine 60 to align and orientate the tool 64 along the axis 68. As appreciated, the specific configuration of machine and tool mounting features of the tool holder 70 are as is known to a worker skilled in the art, and other configuration of alignment and securing features are within the contemplation of this invention.

The face 106 of the insert 74 includes the openings 87 of each of the passages 86 disposed annularly about the face 106 of the insert 74. The angular spacing between each of the passages shown at 100 may be of any angle required by the specific application. Preferably, the distance between the passages is 45°, however, with additional passages 86 the specific angular distance between passages may be increased or decreased as required by the specific application.

At least two of the passages 86 are at a differing angle relative to the axis 68. Preferably, one of the angles is 15° relative to the axis 68 and another of the angles is 8° relative to the axis 68. In another embodiment, at least one passage 86 is disposed at 2° and at least one other passage 86 is disposed at 5°. The differing angles provides for the direction of coolant flow along different points of the tool 64. It is within the contemplation of this invention that the specific angles of the passages may be of any angular dimension relative to the axis 68 required to uniformly and consistently provide coolant to the tool 64 such that the entire tool 64 is uniformly and consistently cooled. In other words, the passages 86 direct coolant along the tool 64 such that the tool maintains a uniform and consistent temperature, which in turn extends the life of the tool 64 and improves the cutting life and surface finish machined by the tool 64.

Figure 13:
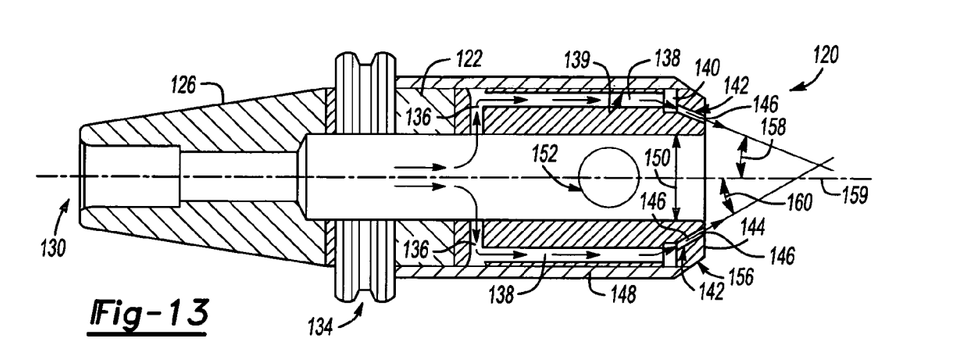
FIG. 13 is a cross-sectional view of another embodiment of this invention.
Figure 14:
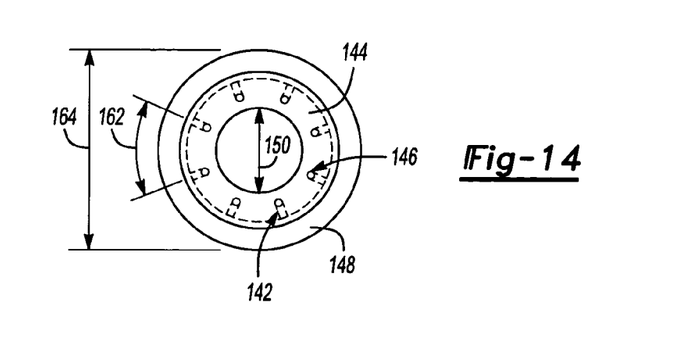
FIG. 14 if a plan view of the embodiment of FIG. 13.

Referring to FIGS. 13 and 14, another embodiment of a tool holder is generally indicated at 120. The tool holder 120 includes a body portion 122 having an inlet 130 through which coolant flows to lateral passages 136 that are in turn in fluid communication with coolant channels 138. The coolant channels 138 are in fluid communication with an annular channel 140. The annular channel 140 is in turn in fluid communication with fluid passages 142. The fluid passages 142 direct coolant along the axis 159. At least two of the fluid passages 142 are at differing angles 158, 160. The differing angles of the fluid passages 142 provide for the direction of coolant fluid along different points of the axis 159. Preferably, one of the angles 158, 160 is 820, and at least one other angle is 15°. In another preferred combination, one angle 158, 160 is 220 and another angle is 520 relative to the central axis 159.

The tool holder 120 of this embodiment includes the coolant channels 138 that are formed on an outer periphery of the body 122. As appreciated forming grooves on an outer periphery 139 of the body 122 simplifies manufacture of the tool holder assembly 120. The coolant channels 138 eliminate requirement for deep drilling within the tool body 122. The coolant channels 138 are completed by pressing the sleeve 148 onto the body 122. The sleeve 148 seals and completes formation of coolant channels 138 that are in fluid communication with the inlet 130.

The inlet 130 is disposed at a rear portion of the body 122. The body 122 also includes a tapered portion 126. The tapered portion 126 cooperates with a mount portion 134 of the tool body 122. This configuration is as is known to a worker skilled in the art and may be of differing configuration as is required for the specific application.

The inlet 130 is disposed in a rear portion of the body 122 and cooperates with machine internal coolant system (not shown). In machines equipped with a coolant system coolant is provided through the rear of the tool holder 120 to a tool mounted within the inner diameter 150 of the tool holder 120. Coolant provided from the rear of the tool holder 120 is preferable injected through a tool mounted within the tool holder 120. However, in some instances tools are used with specific tool holders that do not include passages that allow coolant to run therethrough. In these instances, the tool holder 120 includes fluid channels that direct fluid from the inlet 130 to the coolant passages 142 at a face 144 of the tool holder 120. Coolant may also be routed to the fluid passages 142 with the use of a tool (not shown here) including flow passages for that coolant.

At least one setscrew 152 is provided to secure a tool within the tool holder 120. The tool preferably will mount within the inner diameter 150 of the tool holder 120. It should be understood that it is within the contemplation of this invention that the tool holder 120 may be modified as is known to a worker skilled in the art to conform and fit differing tool sizes where the inner diameter 150 would be modified to fit tools of differing outer diameters.

The tool holder 120 includes the face 144. The face 144 includes a plurality of openings 146. The openings 146 do not extend outward from the face 144. This provides for no intrusion on the tool or the work piece for the tool holder 120. The outer diameter 164 of the tool holder 120 is sized as required for this specification application. The openings 146 are disposed about the axis 159 at an angle relative to each other 162. This angle is preferably 45° but may be of any angle designed and configured to provide coolant along the axis 159 to a tool.

The outer sleeve 148 is sized to fit onto the tool body 122 and become and integral part therewith. Preferably, the outer sleeve 148 is heated to an elevated temperature relative to the tool body 122 and then pressed on to the tool body 122. As appreciated once the outer sleeve 148 cools to a temperature substantially the same as the tool body 122 it will become an integral part of the tool holder 120. Once the outer sleeve 148 has cooled it will contract to form a fluid tight seal around the body 122. The outer sleeve 148 completes the coolant grooves 138 from the lateral passage 136 to the annular channel 140.

Figures 15, 16:
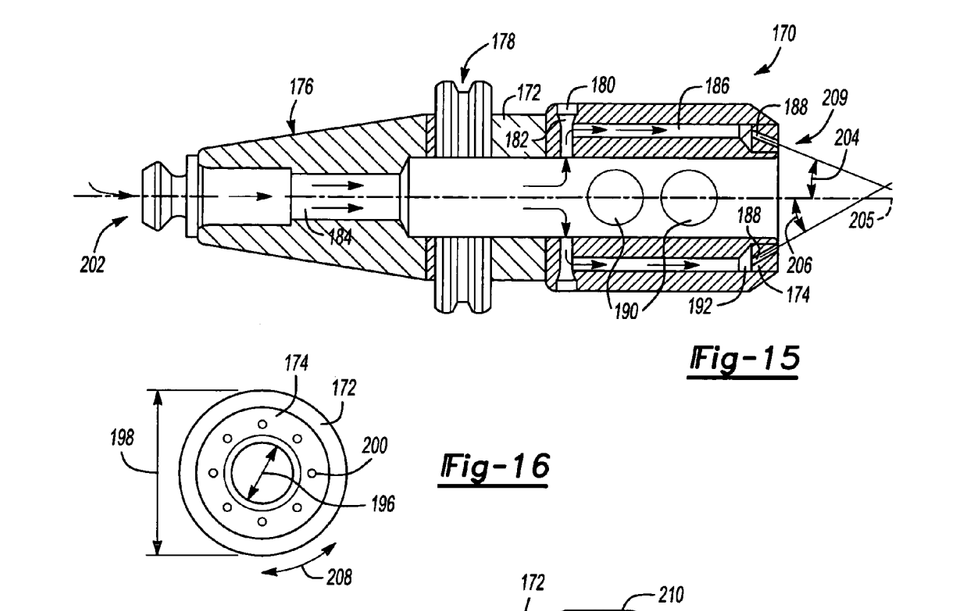
FIG. 15 is a cross-sectional view of another embodiment of this invention.
FIG. 16 is a plan view of the embodiment in shown in FIG. 15.

Referring to FIGS. 15 and 16 another embodiment of the tool holder is generally shown at 170. The tool holder 170 includes an inlet 202 through a rear portion of a body 172. The body 172 also includes a tapered portion 176 and a mount portion 178. The inlet 202 provides coolant fluid through an inlet passage 184. The inlet passage 184 is in turn in fluid communication with lateral passages 182. In this embodiment of the tool holder 170 the fluid passages from the annular groove channel 192 are drilled therefore removing the need for the outer sleeve as shown in the embodiment of FIG. 13. Coolant channels 186 are formed by drilling a hole from the annular channel 192 to lateral channels 182 that drilled from an outer diameter 198 of the tool holder 170 to communicate with the inlet passage 184. The lateral passages are then plugged with plugs 180. The body portion 172 includes setscrews 190 to secure a tool within the inner diameter 196.

The insert 174 in this embodiment is pressed within the annular channel 192. The insert includes the passages 188 disposed at an angle 204, 206 relative to the central axis 205. As a appreciated and discussed in and throughout this application the differing angles of the coolant passages 188 provides for coolant to be directed at differing points along the axis 205 to provide optimal coverage and cooling of a tool mounted within the tool holder 170. Each of the coolant passages 188 includes an opening 200. No portions of the coolant passages 188 extend beyond the face 209 of the tool holder 170.

Preferably the insert 174 is fabricated from a brass material however it is within the contemplation of this invention that the insert 174 may be fabricated from many material as is known by workers skilled in the art. Further, the tool holder 170 is fabricated from any material known to a worker skilled in the art.

Figure 17:
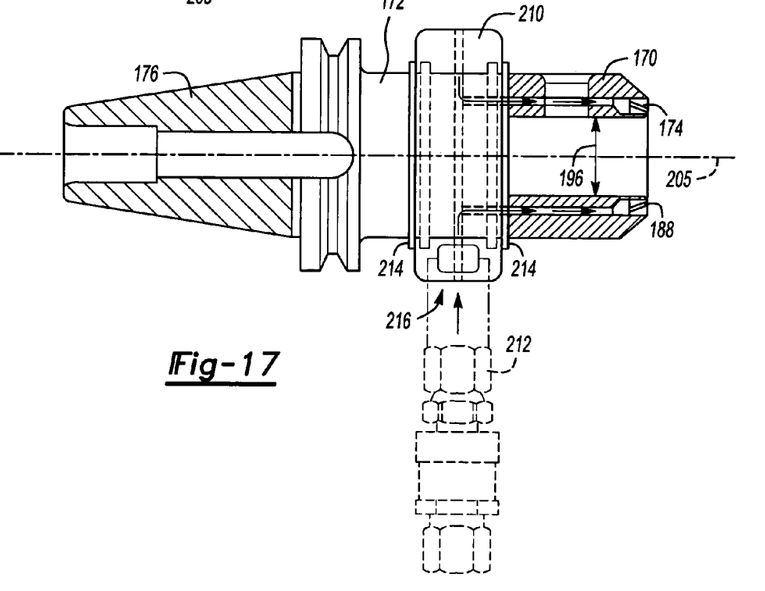
FIG. 17 is a partial cross-sectional view of an embodiment of this invention.

Referring to FIG. 17 another embodiment of the tool holder 170 is shown including an inlet collar 210. In this embodiment, coolant fluid is provided to the tool holder 170 through a stationary ring 210. As appreciated, the tool holder 170 rotates about the axis 205. In this embodiment, coolant is provided to the tool holder through the stationary ring 210. The stationary ring cooperates with the tool holder 170 to provide coolant through the rotating tool holder 170. The rotating collar 210 includes seals 214 cooperating with a body portion of the tool holder 172. The insert 174 receives coolant from the inlet 216 through he coolant hose 212.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A coolant assembly for supplying cooling fluid to a tool comprising;
    an outer ring including an inlet for coolant;
    an insert fixed within said outer ring including an annular channel in fluid communication with said inlet, said insert including a face perpendicular to an axis of rotation of the tool and coolant passages disposed within said insert at an angle relative to said axis of rotation, and a flat surface for locating said insert relative to said axis, wherein said coolant assembly is fixed relative to rotation of the tool, and wherein said coolant passages are arranged annularly about said face and each of said coolant passages includes an opening flush with said face.

2. The assembly of claim 1, wherein said insert includes an inner diameter cooperating with the tool for positioning said cooling assembly, said inner diameter providing a desired clearance between an outer diameter of the tool thereby providing for rotation of the tool relative to said coolant assembly.

3. The assembly of claim 1, wherein said insert includes a coolant hole disposed within an inner diameter of said insert for communicating coolant fluid between the tool and said insert.

4. The assembly of claim 1, wherein said coolant passages are arranged annularly at radial intervals of 45°.

5. The assembly as recited in claim 1, wherein at least two of said coolant passages are disposed at different angles relative to said axis such that coolant fluid contacts the tool at different points along said axis.

6. The assembly as recited in claim 3, wherein coolant communicated between the tool and said insert forms a fluid bearing providing for rotation of the tool relative to said coolant assembly.

7. A coolant assembly for supplying cooling fluid to a tool comprising:
    an outer ring including an inlet for coolant;
    an insert fixed within said outer ring including an annular channel in fluid communication with said inlet, said insert including a face perpendicular to an axis of rotation of the tool and coolant passages disposed within said insert at an angle relative to said axis of rotation of the tool, wherein said assembly is held in place relative to the tool by a coolant supply line.

8. A tool holder assembly for mounting a tool comprising;
    an inlet for supplying coolant; and
    a body portion for mounting the tool along an axis including a coolant channel communicating coolant from said inlet to a plurality of coolant passages, said coolant channel formed by grooves disposed on an outer periphery of said body and an outer sleeve disposed about said body portion; said coolant passages disposed at an angle relative to said axis.

9. The assembly of claim 8, wherein said body portion includes said inlet.

10. The assembly of claim 8 wherein one of said coolant passages is disposed at an angle of 1520 relative to said axis, and another of said coolant passages is disposed at an angle of 8°.

11. The assembly of claim 8, wherein one of said coolant passages is disposed at an angle of 220 relative to said axis, and another of said coolant passages is disposed at an angle of 5°.

12. The assembly as recited in claim 8, wherein at least two of said coolant passages are disposed at different angles relative to said axis such that coolant fluid contacts the tool at different points along said axis.

* * * * *

UNITED STATES PATENT AND TRADEMARK OFFICE
CERTIFICATE OF CORRECTION

PATENT NO.       : 7,134,812 B2                                    Page 1 of 1
APPLICATION NO.  : 10/197390
DATED            : November 14, 2006
INVENTOR(S)      : Kevin Beckington

It is certified that error appears in the above-identified patent and that said Letters Patent is hereby corrected as shown below:

Claim 10, Column 9, line 8: "1520" should be --15°--

Claim 11, Column10, line 2: "220" should be --2°--

Signed and Sealed this

Sixth Day of March, 2007

JON W. DUDAS
*Director of the United States Patent and Trademark Office*